J. E. MERRITT.
Saw-Hangings.
No. 142,036. Patented August 19, 1873.
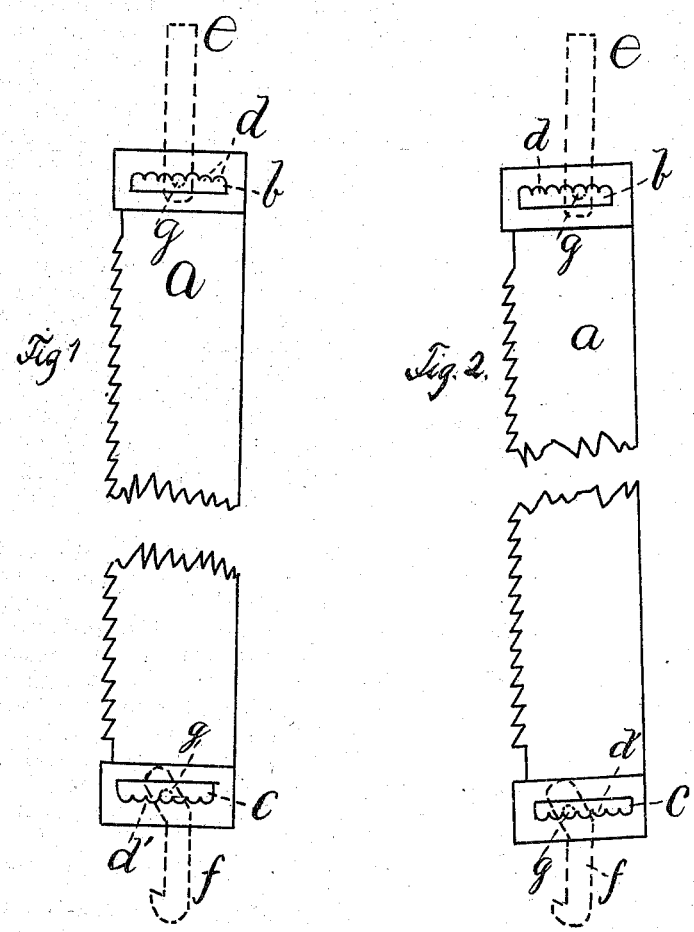
Witness
W. E. Brown
H. E. Brown
Inventor
Joseph E. Merritt
Per Franklin Seavy Atty.

UNITED STATES PATENT OFFICE.

JOSEPH E. MERRITT, OF BANGOR, MAINE.

IMPROVEMENT IN SAW-HANGING.

Specification forming part of Letters Patent No. 142,036, dated August 19, 1873; application filed June 2, 1873.

*To all whom it may concern:*

Be it known that I, JOSEPH E. MERRITT, of Bangor, in the county of Penobscot and State of Maine, have invented certain new and useful Improvements in Saw-Hanging; and I do hereby declare that the following is a full, clear, and exact description thereof, that will enable others skilled in the art to which it appertains to make and use the same, reference being had to the accompanying drawings and to the letters of reference marked thereon, which form a part of this specification, in which—

Figure 1 shows a side view of my invention; Fig. 2, method of changing overhang.

Same letters show like parts.

My invention relates to an improved method of attaching to gang and muley saws the straps which connect them to the cross-heads. These straps are now secured to the saw by means of a bolt or rivet passing through the saw midway between the front and back edges.

While the saw is new both edges receive an equal strain, but as the teeth wear away the front edge receives the greater part, allowing the back to buckle. This necessitates moving the strap back, and a new rivet-hole has to be made in the saw.

By my invention I avoid making new rivet-holes, and enable the position of the strap to be readily changed. It also enables the overhang of the saw to be varied with ease, while at the same time my method of securing the strap occupies no more space than by the old method of riveting. This is an important feature in sawing thin lumber, when the saws composing the gang must be set closely together.

My device will be understood by reference to the drawing.

At $a$ is shown the saw, having at top and bottom transverse slots $b$ $c$, with semicircular notches $d$ $d'$ cut therein upon the sides of the slots nearest the ends of the saw. Each notch at top is in line with a corresponding notch at the bottom. At $e$ $f$ are the upper and lower straps, passing down on each side of the saw, as common, and secured by rivets $g$ passing through the slots $b$ $c$. These rivets fit the notches in the slots, and when the saw is strained are kept from slipping in said slots by them. As the saw wears away the straps may be loosened at their connection with the cross-heads and the saw unstrained; the straps then moved back to a notch nearer the middle of the saw, thus equalizing the strain between the edges. The overhang may be adjusted by loosening the straps, as above, and throwing the upper end of the saw forward and its lower end back, engaging the rivets in the proper notches $d$ $d'$ to obtain the overhang required. (See Fig. 2.) The straps are attached to the cross-heads in the ordinary way.

I do not claim, broadly, the slots $b$ $c$. These have been used before; but the strap has been retained in position by bolts and nuts, which screwed up and held it tightly; but the amount of room necessary for the bolt-heads and nuts prevents their use in gang-saws when thin boards are to be sawed, as the saws cannot be brought close enough together.

What I claim as my invention, and desire to secure by Letters Patent, is—

In a saw, the transverse slots $b$ $c$, provided with notches $d$, whereby the straps are made adjustable, substantially as set forth and shown.

In testimony that I claim the foregoing I have hereunto set my hand this 12th day of May, 1873.

JOSEPH E. MERRITT.

Witnesses:
JACOB STERN,
WM. FRANKLIN SEAVEY.